United States Patent
Voigt et al.

(10) Patent No.: US 12,106,476 B2
(45) Date of Patent: Oct. 1, 2024

(54) TECHNIQUE FOR ASSIGNING A PERFUSION METRIC TO DCE MR IMAGES

(71) Applicant: SIEMENS HEALTHINEERS AG, Forchheim (DE)

(72) Inventors: Ingmar Voigt, Erlangen (DE); Marcel Dominik Nickel, Herzogenaurach (DE); Tommaso Mansi, Plainsboro, NJ (US); Sebastien Piat, Lawrence Township, NJ (US)

(73) Assignee: Siemens Healthineers AG, Forchheim (DE)

( * ) Notice: Subject to any disclaimer, the term of this patent is extended or adjusted under 35 U.S.C. 154(b) by 378 days.

(21) Appl. No.: 17/662,088

(22) Filed: May 5, 2022

(65) Prior Publication Data

US 2022/0375073 A1    Nov. 24, 2022

(30) Foreign Application Priority Data

May 21, 2021    (EP) ..................... 21175153

(51) Int. Cl.
*G06T 7/00* (2017.01)
*G06N 3/04* (2023.01)
(Continued)

(52) U.S. Cl.
CPC ............. *G06T 7/0012* (2013.01); *G06N 3/04* (2013.01); *G06T 5/92* (2024.01); *G06T 7/30* (2017.01);
(Continued)

(58) Field of Classification Search
CPC ........... G06T 7/0012; G06T 5/92; G06T 7/30; G06T 2207/10088; G06T 2207/20081;
(Continued)

(56) References Cited

U.S. PATENT DOCUMENTS 9,892,361 B2    2/2018    Nguyen et al.
10,032,281 B1    7/2018    Ghesu et al.
(Continued)

OTHER PUBLICATIONS

Sanders, et al., "Synthetic generation of DSC-MRI-derived relative CBV maps from DCE MRI of brain tumors," Magn reason Med, 2021: 85:469-479.
(Continued)

*Primary Examiner* — Dhaval V Patel

(57) ABSTRACT

DCE MR images are obtained from a MR scanner and under a free-breathing protocol is provided. A neural network assigns a perfusion metric to DCE MR images. The neural network includes an input layer configured to receive at least one DCE MR image representative of a first contrast enhancement state and of a first respiratory motion state and at least one further DCE MR image representative of a second contrast enhancement state and of a second respiratory motion state. The neural network further includes an output layer configured to output at least one perfusion metric based on the at least one DCE MR image and the at least one further DCE MR image. The neural network with interconnections between the input layer and the output layer is trained by a plurality of datasets, each of the datasets having an instance of the at least one DCE MR image and of the at least one further DCE MR image for the input layer and the at least one perfusion metric for the output layer.

20 Claims, 8 Drawing Sheets

(51) Int. Cl.
*G06T 5/92* (2024.01)
*G06T 7/30* (2017.01)

(52) U.S. Cl.
CPC .............. *G06T 2207/10088* (2013.01); *G06T 2207/20081* (2013.01); *G06T 2207/20084* (2013.01); *G06T 2207/30096* (2013.01)

(58) Field of Classification Search
CPC . G06T 2207/20084; G06T 2207/30096; G06T 2207/10076; G06T 2207/10096; G06T 2207/30104; G06T 7/0016; G06N 3/04
See application file for complete search history.

(56) References Cited

U.S. PATENT DOCUMENTS

| | | | |
|---|---|---|---|
| 10,297,027 | B2 | 5/2019 | Scutaru et al. |
| 10,753,997 | B2 | 8/2020 | Odry et al. |
| 11,004,198 | B2* | 5/2021 | Isgum ............... G06F 18/2411 |
| 11,024,024 | B2* | 6/2021 | Arnold ............... G06N 3/049 |
| 11,682,145 | B2* | 6/2023 | Zeller ............... G06T 7/0016 382/131 |
| 2017/0116748 | A1 | 4/2017 | Scutaru et al. |
| 2018/0225823 | A1 | 8/2018 | Zhou et al. |
| 2019/0049540 | A1 | 2/2019 | Odry et al. |
| 2019/0099159 | A1 | 4/2019 | Voigt et al. |
| 2019/0259153 | A1 | 8/2019 | Zhang et al. |
| 2020/0167926 | A1* | 5/2020 | Dadiani ............... G06T 5/70 |
| 2020/0184660 | A1 | 6/2020 | Shi et al. |

OTHER PUBLICATIONS

Simeth, et al. "GAN and dual-input two-compartment model-based training of a neural network for robust quantification of contrast uptake rate in gadoxetic acid-enhanced MRI," Med. Phys. 47(4), Apr. 2020.

Feng et. al.: XD-GRASP: "Golden-angle radial MRI with reconstruction of extra motion-state dimensions using compressed sensing", Magn Reson Med. Feb. 2016;75(2):775-88. doi: 10.1002/mrm.25665.

Kaltenbach et al: "Dynamic Liver Magnetic Resonance Imaging in Free-Breathing: Feasibility of a Cartesian T1-Weighted Acquisition Technique With Compressed Sensing and Additional Self-Navigation Signal for Hard-Gated and Motion-Resolved Reconstruction", Invest Radiol. Nov. 2017;52(11):708-714. doi: 10.1097/RLI.0000000000000396.

Yoon et al: "Clinical Feasibility of Free-Breathing Dynamic T1-Weighted Imaging With Gadoxetic Acid-Enhanced Liver Magnetic Resonance Imaging Using a Combination of Variable Density Sampling and Compressed Sensing", Invest Radiol. Oct. 2017;52(10):596-604. doi: 10.1097/RLI.0000000000000385.

Tanner et. al. " Generative Adversarial Networks for MR-CT Deformable Image Registration, Jul. 2018, Arxiv preprint https://arxiv.org/abs/1807.07349.

Huizinga et al. "PCA-based groupwise image registration for quantitative MRI", 2016, Medical Image Analysis https://www.sciencedirect.com/science/article/pii/S1361841515001851.

Yong et al. "Free-Breathing Liver Perfusion Imaging Using 3D Through-Time Spiral GRAPPA Acceleration", 2015, Investigative Radiology https://www.ncbi.nlm.nih.gov/pmc/articles/PMC4423561/.

J Krebs, T Mansi, B Mailhé, N Ayache, H Delingette: "Unsupervised Probabilistic Deformation Modeling for Robust Diffeomorphic Registration", MICCAI Workshop on Deep Learning in Medical Image Analysis 2018, https://export.arxiv.org/pdf/1804.07172.

Y Hu et al. "Adversarial Deformation Regularization for Training Image Registration Neural Networks", MICCAI 2018, https://arxiv.org/ftp/arxiv/papers/1805/1805.10665.pdf.

M Rohe et al: "SVF-Net: Learning Deformable Image Registration Using Shape Matching", MICCAI 2017, https://hal.inria.fr/hal-01557417.

J Fan et al. "Adversarial Similarity Network for Evaluating Image Alignment in Deep Learning based Registration", MICCAI 2018, https://www.ncbi.nlm.nih.gov/pmc/articles/PMC6322551/pdf/nihms-988371.pdf.

B. Odry, B. Maihle, M Nadar, P. Ceccaldi: "Data-driven Modality Synthesis using Generative Adversarial Networks", Apr. 2017, Internal file reference file No. 2017E08319US; A provisional patent application was filed Aug. 10, 2017 (U.S. Appl. No. 62/543,561).

Erik L. Ridley, "ISMRM: AI can generate synthetic contrast-enhanced MRI" Abstract. Obtained Apr. 28, 2022. https://www.auntminnie.com/index.aspx?sec=rca&sub=ismr_2019&pag=dis&ItemID=125522.

"Compressed Sensing GRASP-VIBE"; https://www.siemens-healthineers.com/magnetic-resonance-imaging/options-and-upgrades/clinical-applications/compressed-sensing-grasp-vibe; Date of screenshot: Apr. 20, 2021.

"Tissue4D" offers automatic compensation of respiratory motion, based on 3D elastic registration of all timesteps of the 3D+t image to a manually selected timestep (a.k.a. key frame); https://www.siemens-healthineers.com/magnetic-resonance-imaging/options-and-upgrades/clinical-applications/tissue-4d; Date of screenshot: Apr. 20, 2021.

Extended European Search Report (EESR) mailed Nov. 12, 2021 in corresponding European Patent Application No. 21175153.2.

* cited by examiner

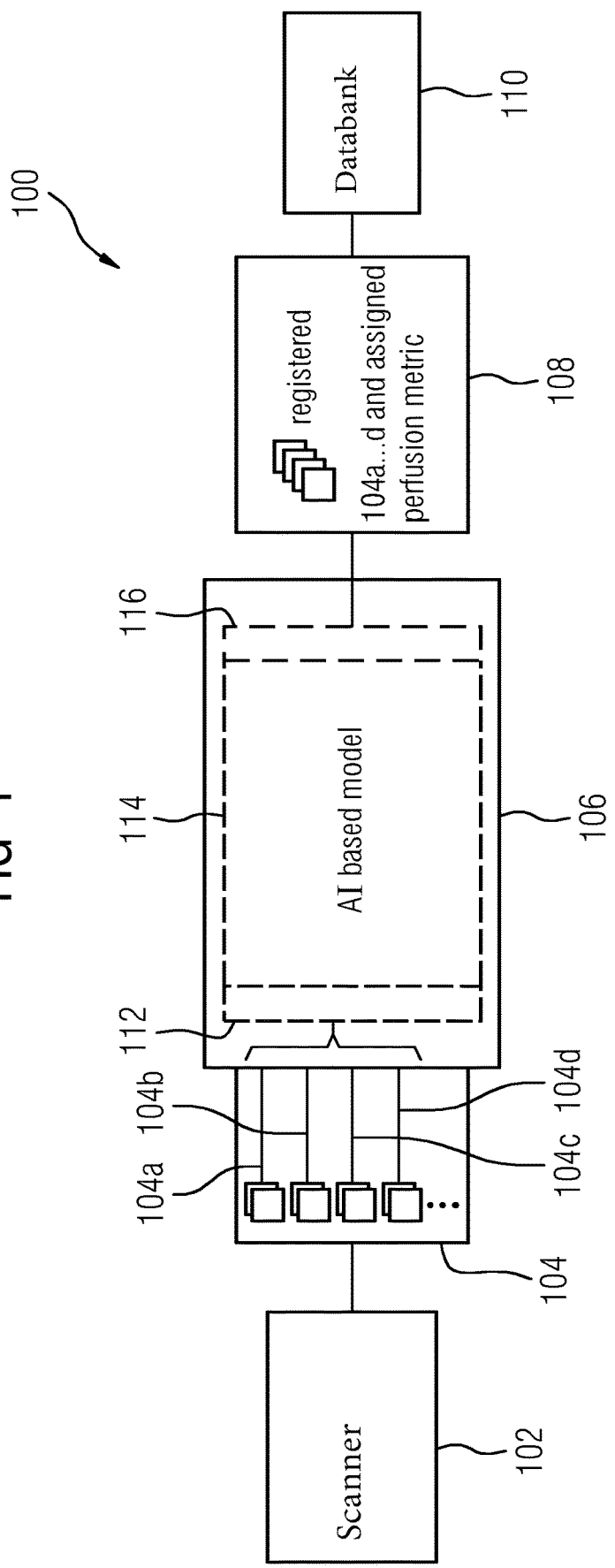

cycle GAN

TECHNIQUE FOR ASSIGNING A PERFUSION METRIC TO DCE MR IMAGES

RELATED APPLICATION

This application claims the benefit of EP 21175153.2, filed May 21, 2021, which is hereby incorporated by reference in its entirety.

FIELD

The present disclosure relates to a technique for assigning lesion quantification to dynamic contrast-enhanced (DCE), perfusion-weighted magnetic resonance (MR) images. More specifically, and without limitation, a neural network system, a method, and a computer program product are provided for performing pharmacokinetic measurements by artificial intelligence (AI) using dynamic contrast-enhanced MR images. These images have been obtained from a MR scanner and under a free-breathing protocol.

TECHNICAL BACKGROUND

Processing of DCE MR images provides lesion-specific permeability parameters. The processing principle is based on administering a contrast agent to a patient during imaging which reduces a relaxation time of water protons in comparison to MR imaging without contrast agent. Based on the varying relaxation time, pharmacokinetic models of a respective tissue, organ, or vessel are derived, often by consulting three dimensional DCE MR images over time (3d+t DCE MR images) or two-dimensional DCE MR images over time (2d+t DCE MR images). In particular, the DCE MR images are processed to investigate perfusion and to assign a perfusion metric to the tissue, organ, and/or vessel of interest. However, the administered contrast agent leads to DCE MR images with different appearances, which needs to be taken into account during processing.

Respiratory motion poses another challenge. Ideally, DCE MR imaging is performed under a free breathing protocol as patients may not be able to hold their breath long enough or at all. However, free breathing causes direct or indirect movement of tissues, organs, or vessels, in particular in the vicinity to the respiratory system and/or diaphragm. This movement, however, disturbs spatial correspondence between the 3d+t and/or 2d+t DCE MR images which is required for processing. Thus, for accurate lesion quantification compensation respiratory motion is required, especially for blood vessels through which the contrast agent is passing.

Current approaches to address these challenges are based on 3D elastic registration of all timesteps of the 3D+t and/or 2d+t images to a manually selected timestep or, respectively, key frame. An intensity-based similarity metric is used. Obtaining accurate results based on this metric remains limited when registering images of significantly different appearances as it is the case, for instance, during contrast agent uptake.

Another approach employs smart reconstruction techniques for image quality improvement. In particular, an additional "extended dimension" (XD), which represents motion states, is reconstructed from MR images. As a result, a five-dimensional sequence composed of 3D volumes over time and motion state is generated. Feng et al., for example, propose to sort continuously acquired radial k-space data intro respiratory states using a respiratory motion signal which is extracted from the data while maintaining the same number of spokes per motion state in "XD-GRASP: Golden-angle radial MRI with reconstruction of extra motion-state dimensions using compressed sensing", Magn Reson Med. 2016 February; 75(2):775.

Similar approaches are discussed in Kaltenbach et al. in "Dynamic Liver Magnetic Resonance Imaging in Free-Breathing: Feasibility of a Cartesian T1-Weighted Acquisition Technique With Compressed Sensing and Additional Self-Navigation Signal for Hard-Gated and Motion-Resolved Reconstruction", Invest Radiol. 2017 November; 52(11):708 or Yoon et al. in "Clinical Feasibility of Free-Breathing Dynamic T1-Weighted Imaging With Gadoxetic Acid-Enhanced Liver Magnetic Resonance Imaging Using a Combination of Variable Density Sampling and Compressed Sensing", Invest Radiol. 2017 October; 52(10):596.

A further approach for respiratory motion compensation includes the use of generative adversarial networks (GANs) to map inter-modal images obtained from magnetic resonance (MR) and computer tomography (CT). The GAN-based image synthetization, however, suffers from respiratory misalignment due to large differences in lung volume because of different respiratory phases between corresponding CT and MR images. See: Tanner et. al. in "Generative Adversarial Networks for MR-CT Deformable Image Registration", July 2018, Arxiv preprint https://arxiv.org/abs/1807.07349.

In the area of quantitative magnetic resonance imaging (qMRI) Huizinga et al. discuss group-wise registration approaches for compensating misalignment thereby eliminating the need for choosing a reference image in "PCA-based group-wise image registration for quantitative MRI", Medical Image Analysis 2016, 29:65, doi.org/10.1016/j.media.2015.12.004. Yet, registering a group or series of images at once has been found to come at the expense of computing speed.

For DCE MR imaging, Chen et al. propose imaging-based respiratory gating which entails manual annotation of the liver and determination of motion states using image gradients in "Free-breathing liver perfusion imaging using 3-dimensional through-time spiral generalized autocalibrating partially parallel acquisition acceleration", Invest Radiol. 2015; 50(6):367, doi:10.1097/RLI.0000000000000135.

Recent non-rigid image registration techniques based on deep learning infer a displacement field directly from the input image pair using variational auto-encoders or GANs. They are often trained end-to-end, either fully unsupervised or regularized by biomechanical models or shape matching and predict at high-speed due to a high degree of parallelization.

Among them are non-rigid mono-modal registration techniques, as for instance Krebs et al. in "Unsupervised Probabilistic Deformation Modeling for Robust Diffeomorphic Registration", MICCAI Workshop on Deep Learning in Medical Image Analysis 2018, https://export.arxiv.org/pdf/1804.07172, or Fan et al. in "Adversarial Similarity Network for Evaluating Image Alignment in Deep Learning based Registration", MICCAI 2018, https://www.ncbi.nlm.nih.gov/pmc/articles/PMC6322551/pdf/nihms-988371.pdf, or Hu et al. in "Adversarial Deformation Regularization for Training Image Registration Neural Networks", MICCAI 2018, https://arxiv.org/ftp/arxiv/papers/1805/1805.10665.pdf; or Rohe et al. in "SVF-Net: Learning Deformable Image Registration Using Shape Matching", MICCAI 2017, https://hal.inria.fr/hal-01557417.

Alternatively, non-rigid image registration techniques focus on different modalities with stable appearances, for instance Tanner et. al. in "Generative Adversarial Networks for MR-CT Deformable Image Registration", July 2018, Arxiv preprint https://arxiv.org/abs/1807.07349, or Shi et al. in US 20200184660 A1 (Siemens Healthcare GmbH) 11 Jun. 2020.

Yet, these non-rigid image registration techniques are limited with regards to intensity variation as they are observed, for instance, in DCE MR imaging during contrast uptake. Also, small-scale vessel motion remains to be addressed in latent spaces as well as cross entropy losses outside organ boundaries.

SUMMARY

Accordingly, there is a need for a technique that enables assignment of a perfusion metric from pharmacokinetic measurements (studies) to dynamic contrast-enhanced (DCE) magnetic resonance (MR) images which are obtained from a MR scanner and under a free breathing protocol. Alternatively, or in addition, it is an objective to provide a technique for registration of DCE MR images which are impacted by both, contrast agent enhancement and respiratory motion, without human expertise and/or human assessment.

As to a first aspect, a neural network system for assigning at least one perfusion metric to dynamic contrast-enhanced, DCE, magnetic resonance, MR, images is provided. The DCE MR images are obtained from a MR scanner and under a free-breathing protocol. The neural network system includes an input layer configured to receive at least one DCE MR image representative of a first contrast enhancement state and of a first respiratory motion state and at least one further DCE MR image representative of a second contrast enhancement state and of a second respiratory motion state. The neural network further includes an output layer configured to output at least one perfusion metric based on the at least one DCE MR image and the at least one further DCE MR image. The neural network system also includes interconnections between the input layer and the output layer. The neural network is trained by a plurality of datasets. Each of the datasets includes an instance of the at least one DCE MR image and of the at least one further DCE MR image for the input layer and the at least one perfusion metric for the output layer.

The MR scanner may be a device that is based on MR imaging and translates relaxation times of excited atoms (relaxation time T1 parallel to the static magnetic field and/or T2 transverse to the static magnetic field) into intensity signals. The MR scanner may output three-dimensional and/or two-dimensional MR images that represent the intensity signals of a body part of interest. Often, an MR scanner may acquire multiple three-dimensional and/or two-dimensional DCE MR images over time, which may be referred to herein as '2d+t DCE MR images', or '3d+t DCE MR images', or 'DCE MR image sequence'. The MR scanner may acquire the DCE MR images during one or more sessions. An image acquisition session may last at least several minutes, up to an hour or several hours. Thereby, processes as, for instance, contrast agent uptake by a patient's body may be captured.

The at least one DCE MR image and the at least one further DCE MR image may refer to sub-sequences of 2d+t DCE MR images or 3d+t DCE MR images obtained from the MR scanner. In some cases, the sub-sequence may include only one DCE MR image. In other cases, the sub-sequence may include more than one DCE MR image taken within a short period of time, such that they represent a relatively stable respiratory motion state and/or contrast enhancement state.

'Datasets,' also referred to as training data herein, may include real DCE MR images and/or synthetic images. The latter may be synthesized based on deformations from and/or reparameterization of real datasets. Alternatively, or in addition, it may be synthesized from noise. Datasets may include annotations. These annotations may refer, for instance, to a specific respiratory motion phase and/or to a specific contrast enhancement state. Annotations may also identify the location and/or shape of a specific body part, organ, tissue, and/or vessel. The perfusion metric included in the dataset may have been determined previously, either by human interaction and/or automatically.

Herein, 'free breathing protocol' may relate to an imaging procedure where patients may not be required to hold their breath and/or to breathe in a specific, for instance, flat way. In contrast, patients may be allowed to breathe naturally and freely in a continuous manner. Their breathing may not be limited in any way. The patients' breathing may come along with respiratory motion of the patients' respiratory system and/or diaphragm. Also, other body parts, tissue, organs, and/or vessels may be directly or indirectly affected by respiratory motion. Thus, during imaging, body parts, tissue, organs, and/or vessels of interest may alter in terms of size (for instance deformation such as compression or expansion) and/or location depending on the respiratory motion. This applies particularly to body parts such as the heart, breast, lung, liver, prostate, or microvascular vessels. In a preferred embodiment, liver and/or lung tissue is to be examined and datasets represent tissue of lung and/or liver. For examining this kind of tissue, in particular liver tissue, first, it is necessary to have sufficient spatial resolution to identify small lesions, which is particularly challenging as large volume coverage is required for imaging the entire liver. Second, very high temporal resolution is required for accurate arterial input function (AIF) characterization and perfusion model fitting.

Respiratory motion may follow various healthy or pathologic breathing patterns and appear in a virtually periodic manner, in a regular manner, in an irregular manner, or in a combination thereof. Respiratory motion of the same patient may vary in depth and/or frequency. Respiratory motion may include any motion related to or caused by inhaling and exhaling.

'Respiratory motion state' herein may refer to any motion state within the respiratory cycle, thus between and including inhaling and exhaling and intermediates. Further, respiratory motion state may refer to the size and/or location of the body part, tissue, organ, and/or vessel of interest affected by respiratory motion. The respiratory cycle may include phases where respiratory motion states are relatively stable. In these phases, the size and/or location of the respective body part, tissue, organ, and/or vessel remain relatively steady. DCE MR images that capture these relatively steady phases may be referred to as Ssteady. Alternatively, such time series without respiratory motion may be obtained by motion compensation techniques. For the subsequent use in training the various neural network components, the results of conventional motion compensation techniques—such as XD-GRASP—may be re-used.

The first respiratory motion state and the second respiratory state may refer to the same respiratory motion state. Alternatively, the first respiratory motion state and the second respiratory motion state may refer to two different motion states. Correspondingly, the first and second contrast enhancement state may refer to the same and/or different contrast enhancement states. For example, two DCE MR images may capture different contrast enhancement states while representing the same respiratory motion state. In a corresponding manner, two DCE MR images may capture different respiratory motion states while representing the same contrast enhancement state.

'Pharmakokinetic study' may refer to an examination, measurement or investigation of the human or animal body's processing of a pharmaceutical and/or contrast agent. The processing may, in particular, include the absorption, distribution, metabolization, liberation, and/or excretion of the pharmaceutical and/or contrast agent which has been administered to the body. Based thereon, inferences about and/or models of physiological body characteristics may be drawn. Such a characteristic may, for instance, concern perfusion of a particular body part, organ, vessel, and/or tissue.

A contrast agent may be a suitable substance and/or pharmaceutical that is compatible with the human body while having the characteristic of adapting the magnetic resonance and/or relaxation time of an element and/or element part which is present in the human body, for instance a water proton. An example suitable contrast agent may be Gadolinium. A patient's body that may be administered a dose of a contrast agent may show, for instance, faster contrast enhancement in tumors and/or malign tissue than in healthy tissue due to higher permeability of the former. From the course of contrast enhancement from administering to excreting, valuable health information may be drawn. Contrast enhancement has been shown to add value to examining organs, such as e.g., the liver, the lung, and/or the heart. Administering a contrast agent may change the appearance of the DCE MR images over time, which may need to be considered during image registration.

As the human body may absorb the contrast agent steadily, the appearance of the DCE MR images may change accordingly in a continuous fashion. The continuous change in appearance may be subdivided or classified into respective states. In these states, the appearance of the DCE MR images may be similar or may not be similar. The continuous contrast enhancement may be represented by three phases, namely uncontrasted, contrast uptake, and saturation. In addition, or alternatively, the contrast enhancement may be subdivided into uncontrasted and remaining states or, into saturated and remaining states. Alternatively, it may only be differentiated between saturated and uncontrasted.

'Dynamic contrast enhanced' may refer to a perfusion MR imaging technique, where shortening of the relaxation time T1 parallel to the static magnetic field due to contrast enhancement is measured.

Perfusion may broadly indicate the amount of blood over time that is supplied to a particular body part, organ, vessel, and/or tissue by arteries and/or veins per time unit. In particular, it may indicate at least one of a transfer constant, a measure of capillary permeability (Ktrans), a reflux constant (Kep), and an extra vascular extra cellular volume fraction (Ve). Alternatively, or in addition, the perfusion metric may indicate at least one of time to peak (TTP), mean transit time (MTT), blood volume (BV), blood flow (BF), and k-trans. Deviation of a determined perfusion metric from norm values may indicate lesions, such as malignancy, cancer, in the respective body part, organ, vessel and/or tissue.

Assigning a perfusion metric to dynamic contrast-enhanced, DCE, magnetic resonance, MR, images may include pre-processing, processing, and/or evaluation of DCE MR images to derive a perfusion metric. Additionally, or alternatively, it may include combining the derived perfusion metric and/or other information with pre-processed, processed, and/or original DCE MR images. It may also include saving DCE MR images and derived perfusion metric to a storage, e.g., a databank. Alternatively, or in addition, it may also include retrieving DCE MR images from a databank and deriving perfusion metrics. Assigning may also include identifying a patient's DCE MR images from DCE MR images obtained from a group of patients and sorting the DCE MR images to the respective patient. Assigning may also or alternatively include sorting DCE MR images to same and/or similar pathologic conditions. The output of the neural network system includes a perfusion metric that may be based on and assigned to respective DCE MR images.

The perfusion metric may include a pixel-wise and/or segment-wise output. Herein, 'pixel' may encompass two-dimensional pixels of the MR images. Alternatively, or in addition, 'pixel' may encompass three-dimensional voxels of the MR images.

The technique, particularly the neural network system, may be computer-implemented. The neural network may be implemented, for example, as a convolutional neural network or deep convolutional neural network.

The neural network system may include a first sub-network and a second sub-network. The interconnections may include cross-connection between the first sub-network and the second sub-network at the input layer and/or at least one hidden layer between the input layer and the output layer.

A first sub-network, which may be the first sub-network as mentioned above in the previous paragraph, may be trained to perform contrast enhancement state mapping to map the at least one DCE MR image and the at least one further DCE MR image to the same contrast enhancement state. For this, at least one of a deep image-to-image dual inverse network, a generative adversarial network (GAN), and/or a cycle GAN may be used.

A deep image-to-image dual inverse network may refer to a setup which uses two generators that are mutually inverse. A first generator, Gus, may map, for instance, from an uncontrasted domain to a saturated domain, while a second generator, Gsu, may map from a saturated domain to an uncontrasted domain. Once an image, I, has been synthesized by the first and second generator, and is thereby mapped twice, (Gsu(Gus(I))), it may be equal to the reference image, $I_{ref}$. This may apply in a corresponding manner from mapping saturated domain to a contrasted domain and back to a saturated domain. Thus, both generators may be optimized using identity constrains. The difference between the reference image and the image that has been mapped twice, may be backpropagated to the network. Each of the two generators of the dual inverse network may include, for instance, an encoder and a decoder, and/or an autoencoder. The two generators of this embodiment may be based on representing the images by latent variables and reconstructing the images based on their latent variables. Representation in latent space may include an image reduction and/or image encoding. Latent space may enable low-level representation of a high-level input image. The encoder or both encoders may be trained while the respective decoder or decoders may be frozen. Correspondingly, the decoder or both decoders may be trained while the respective encoder or encoders are frozen. The encoder may be independent from the decoder. Alternatively, or in addition, encoders and decoders may be trained simultaneously. The dual inverse network may adapt aspects which have been described, for instance, by Zhou et al. in US 20180225823 A1. This embodiment basically represents an extension of the GAN principle.

A generative adversarial network (GAN) may consist of a generator and a competing discriminator. The generator may try to generate images that are indistinguishable from reference images, while the discriminator may judge whether the generated images are distinguishable from reference images. Reference images may be referred to herein as 'positives.' In other words, the generator may try to deceive the discriminator. Within the first sub-network, the generator may be trained to generate images that have the same appearance from training data.

The generator may be trained to generate images from random input, for instance, noised images. Alternatively, or in addition, the GAN may be trained to identify invariant features of the input images. These invariant features may concern features that are not affected by contrast enhancement. This may involve a representation of the images in latent space (e.g., as a hidden property/feature in the data). Therefore, the generative network of the GAN may be implemented as a deep fully convolutional dense network or deep beliefs net with contrast enhancement state adaptation to minimize discrepancies between images with different contrast enhancement states. In addition, or alternatively, the generator may be implemented as an autoencoder whose output is fed to the discriminator for classification. The output may be fed to the discriminator in a random order with positives. The classification may be based on a pixel- and/or voxel-based probability of contrast enhancement state. The classification may be fed back to the generator. Training may be completed when the discriminator may no longer be able to detect a difference between generated and positives. An advantageous implementation of the generator may make use of the approach discussed by Odry et al. in U.S. Pat. No. 10,753,997 B2. There, MR images that are obtained under different technical acquisition protocols are synthesized using a trained generator.

The cycle GAN referred to herein may include two or more GANs that may be coupled to each other. Further, the cycle GAN may be coupled to the second sub-network and/or the second sub-network may be a further component of the cycle GAN. The cycle GAN with the integrated second sub-network may be trained by a joint task-driven loss. The cycle GAN may be trained when the second sub-network may be frozen. The cycle may integrate features from above-described deep image-to-image dual inverse network as well, such as mutually inverse generators or identity constraints.

An advantageous implementation of the cycle GAN may not need paired data and/or positives for training. The cycle GAN may adapt aspects discussed by Tanner et. al. in "Generative Adversarial Networks for MR-CT Deformable Image Registration", July 2018, Arxiv preprint https://arxiv.org/abs/1807.07349, or in US 20200184660 A1.

A cycle GAN, which may be the cycle GAN referred to above, may include two GANs. The two GANs may be trained to jointly perform contrast enhancement state mapping. The two GANs may be trained simultaneously and/or in parallel and/or successively. As pointed out above, the contrast enhancement state may indicate continuous contrast enhancement. The continuous contrast enhancement may be represented by uncontrasted to contrast uptake to saturated.

A first of the two GANs may be trained to map an uncontrasted DCE MR image to a predicted contrast uptake DCE MR image and/or a predicted saturated DCE MR image. A second of the two GANs may be trained to map a contrast uptake DCE MR image and/or a saturated DCE MR image to a predicted uncontrasted DCE MR image.

A second sub-network, which may be the second sub-network referred to above, may be trained to estimate a deformation field for registration of the at least one DCE MR image and the at least one further DCE MR image. The at least one DCE MR image and the at least one further DCE MR image may have been mapped to the same contrast enhancement state.

For related work on the aspect of contrast mapping with GANs, it is referred to https://www.auntminnie.com/index.aspx?sec=rca&sub=ismr_2019&pa g=dis&ItemID=125522. However, it is to be noted, that this approach purely focusses on synthetic contrast enhancement on brain MR (to avoid contrast agent), does not mention CycleGANs and is not used for subsequent motion compensation nor perfusion quantification.

'Registration' is to be understood herein as compensation of misalignments between the at least one DCE MR image and the at least one further DCE MR image. These misalignments may have been caused by respiratory motion, patient movement, and/or geometric distortions related to image acquisition. During registration, a pixel-wise and/or voxel-wise correspondence between the reference image and the object image may be established and/or quantified. The at least one DCE MR image may be the object image and the at least one further DCE MR image, the reference image, or vice versa.

The second sub-network may be a non-rigid registration network. The second sub-network may be pre-trained and then frozen before coupling with the first sub-network. The pretraining may include using 3D volume images pairs of the same contrast, for example pairs of uncontrasted, and/or contrast uptake, and/or saturated volume images. Non-rigid registration may refer to elastic registration where images may be warped onto each other.

The second sub-network may be pretrained and/or trained using an inter-modality similarity metric as a loss term. In addition, or alternatively, the second sub-network may be pretrained and/or trained using an intra-modality similarity metric as a loss term. Such an intra-modality metric may include, for instance, localized cross correlation (LCC), and/or sum of squared differences (SSD).

A second sub-network, which may be the second sub-network referred to above, may be trained by at least one of a generative adversarial network, GAN, a conditional variational autoencoder, CVAE, and an intensity-based approach.

Within the second sub-network, a GAN may be trained where a generator is trained as a registration network to predict a deformation field as accurately as possible, whereas the discriminator judges, whether the reference and transformed object image are well aligned. That is, the generator of the second sub-network generates a model of an alignment estimation. Aligned image pairs from a steady respiratory motion phase, Ssteady, may serve as positives for the discriminator, while the output of the registration network may serve as negatives for the discriminator. Judgments of the discriminator may be fed back to the registration network.

Alternatively, or additionally, positives may not be required for training. In addition to optimizing the registration network by a similarity metric, a loss term which considers voxel location may be used which enforces smoothness of the predicted deformation field. The registration network may be implemented as a U-Net regression model. GAN may be implemented using 3D Caffe using Adam optimization. Preferably, the library, disclosed in https://caffe.berkeleyvision.org may be used. In other embodiments, GAN may be implemented with any open source framework, as for instance found on https://pytorch.org/and/or https://www.tensorflow.org/and/or proprietary alternatives. After training and during testing, the generator may then serve as registration network. It may make use of some aspect of the network suggested by Fan et al. in "Adversarial Similarity Network for Evaluating Image Alignment in Deep Learning based Registration", MICCAI 2018, https://www.ncbi.nlm.nih.gov/pmc/articles/PMC6322551/pdf/nihms-988371.pdf.

A conditional variational autoencoder, CVAE, may refer herein to an autoencoder which may include an encoder, decoder, and a loss function. Images may be input to the encoder, which may reduce image size and/or represent the image by latent variables. The autoencoder may output a reconstruction of the latent variables, while the deviation between input images and reconstructed images may be quantified using the loss function.

Within a conditional variational autoencoder, the registration may be predicted probabilistically. The encoder and/or the decoder may be constrained on the moving image. That is, it may be restricted to follow a pre-set distribution thereby limiting the space of plausible deformation with respect to the training data. After training, the trained probabilistic encoding and/or decoding may be maintained. In addition, a smoothness layer may be introduced which may enforce regularity and/or diffeomorphism of the output. An advantageous implementation of the CVAE may make use of the CVAE or aspects of the CVAE discussed by J Krebs et al. in "Unsupervised Probabilistic Deformation Modeling for Robust Diffeomorphic Registration", MICCAI Workshop on Deep Learning in Medical Image Analysis 2018, https://export.arxiv.org/pdf/1804.07172.

The intensity-based approach may estimate a deformation field, or a transform, based on intensity pattern comparison between the at least one DCE MR image and the at least one further DCE MR image. The intensity pattern comparison may be based on the entire DCE MR images, sub-images, grouped pixels, grouped voxel, and/or frames. The intensity approach may be optimized by a similarity metric which compares the local similarity between the reference image and the transformed object image.

A first sub-network and/or a second sub-network may be trained by unpaired datasets and/or by paired datasets. 'Paired' is to be understood herein as grouping datasets by a common characteristic, for instance contrast enhancement or respiratory motion state. The first and second sub-networks may be the first and second sub-networks referred to above. The datasets may be paired by respiratory motion state. The paired datasets may be obtained by reconstructing an extra respiratory motion state dimension based on respiratory motion signals derived from the datasets.

In particular, the respiratory motion signals may be derived from signals which are generated by a coil of the MR scanner which is close to the diaphragm. The signals may be represented in k-space where the signal representation may be sorted into respiratory motion phases between inhale and exhale, based on which a five-dimensional sequence may be composed of 3D volumes over time and respiratory motion state as separate dimensions. Typically, the respiratory motion states may be subdivided into a number of phases, for instance six, between inhale and exhale, where each one of the number of phases represent relatively stable respiratory motion phases, Ssteady. The approach may make use of aspects discussed by Feng et al. in "XD-GRASP: Golden-angle radial MRI with reconstruction of extra motion-state dimensions using compressed sensing", Magn Reson Med. 2016 February; 75(2):775.

Alternatively, or in addition, the paired datasets may be obtained by measuring craniocaudal movement of an automatically and/or semi-automatically and/or manually annotated landmark. An annotated landmark may identify a location of a specific body part, organ, tissue, and/or vessel. The annotation of a landmark may be obtained using statistical shape models and/or parameterization models which define the shape of the object of interest in three dimensions. The models may be derived from ground-truth data and may borrow aspects discussed in Ghesu et al., in U.S. Pat. No. 10,032,281 B1.

Alternatively, or in addition, the annotation of a landmark may be obtained by an edge detection method. The method may include automatically forming a reference list of frames in which the object is respectively in the same position. Remaining frames may be registered to their nearest temporal neighbor within the list Chen et al. have implemented this approach for the liver, which has been shown to be in the same respiratory motion state within 20-25% of frames in "Free-breathing liver perfusion imaging using 3-dimensional through-time spiral generalized autocalibrating partially parallel acquisition acceleration", Invest Radiol. 2015; 50(6):367, doi:10.1097/RLI.0000000000000135.

As an alternative or as an addition, the annotation of a landmark may be obtained with the aid of user interaction. Through an interface, a user may place one or more rays on an object within a DCE MR image. A data subset of the DCE MR image may be defined based on the rays and/or an automatic program may search for intensities along and in parallel to the one or more rays. From the intensities, organ boundaries and/or locations may be derived. The method may adapt aspects discussed by Voigt et al. in US 20190099159 A1.

A first sub-network and a second sub-network may be trained jointly and/or separately by minimizing at least one loss term. The first and second sub-network may be the first and second sub-network referred to above.

The at least one loss term may refer to one loss term that represents one loss metric and/or function. Alternatively, or in addition, it may refer to a loss term that combines more than one loss terms in a weighted and/or unweighted manner. Alternatively, or in addition, the at least one loss term may include several loss terms which are each minimized separately and/or in a combined manner.

The at least one loss term may be used to train the contrast normalization for registration accuracy. The at least one loss term may be defined as a task driven loss by coupling the first sub-network and the pretrained registration network. The registration network may be frozen and the discriminators may be fed with pre-aligned positives while the output of the first sub-network may serve as negatives. The discriminators may judge registration quality of the registration network. Thereby, the at least one loss term may be minimized using pre-aligned positives.

The at least one loss term may be representative of the registration quality between predicted saturated DCE MR image and/or predicted uptake DCE MR image and registered uptake DCE MR image and/or saturated DCE MR image. Alternatively, or in addition, the at least one loss term may be representative of the registration quality between predicted uncontrasted DCE MR image and registered uncontrasted DCE MR image.

The at least one loss term or a further loss term may be representative of artificial deformations, in particular at vessels. Therefore, a similarity-based loss may be combined with vessel landmark annotation which may in particular penalize critical artificial deformation at the vessel.

The at least one loss term may be a further loss term representative of a cycle-consistency and/or a cycle consistency combined with registration accuracy. In particular, the loss term may be representative of an image similarity loss between the predicted contrast uptake DCE MR image and/or predicted saturated DCE MR image and a uncontrasted DCE MR image. In addition, or alternatively, the loss term may be representative of an image similarity loss between the predicted uncontrasted DCE MR image and the predicted contrast uptake DCE MR image and/or predicted saturated DCE MR image. In addition, or alternatively, the loss term may be representative of a deformation loss between a predicted uncontrasted DCE MR image and a uncontrasted DCE MR image.

The at least one loss term or a further loss term may be representative of a spatio-temporal consistency loss. Accordingly, a loss term may be defined which quantifies a loss between a predicted saturated DCE MR spatio-temporal image sequence and paired steady respiratory motion state DCE MR images. Alternatively, or in addition, a loss term may quantify a loss between the predicted saturated DCE MR images within the 2D sequence.

As to a second aspect, a method of assigning at least one perfusion metric to dynamic contrast-enhanced, DCE, magnetic resonance, MR, images is provided. The DCE MR images are obtained from a MR scanner under a free-breathing protocol. The method uses a neural network system and the method includes the acts of receiving, at an input layer, at least one DCE MR image representative of a first contrast enhancement state and of a first respiratory motion state and at least one further DCE MR image representative of a second contrast enhancement state and of a second respiratory motion state and outputting, at an output layer, at least one perfusion metric based on the at least one DCE MR image and the at least one further DCE MR image. The method includes training the neural network system, which is provided with interconnections between the input layer and the output layer, by a plurality of datasets, each of the datasets including an instance of the at least one DCE MR image and of the at least one further DCE MR image for the input layer and the at least one perfusion metric for the output layer.

The method may also include the act of pretraining a sub-network to perform registration of the at least one DCE MR image and the at least one further DCE MR image. In addition, or alternatively, the method may also include training a sub-network to map the at least one DCE MR image and the at least one further DCE MR image to the same contrast enhancement state.

The method may further include the act of training the neural system and/or the first sub-system and/or the second sub-system with paired datasets, wherein the datasets are paired by respiratory motion state. Alternatively, or in addition, the method may further include obtaining paired datasets by reconstructing an extra respiratory motion state dimension based on respiratory motion signals derived from the datasets and/or measuring craniocaudal movement of an automatically and/or semi-automatically and/or manually annotated landmark.

The method may further include one or more acts for the training and/or for the outputting of the at least one perfusion metric using the neural network system according to or corresponding to the first aspect.

As to a third aspect, a computer program product is provided, including program code portions for performing any of the acts of the method and/or of the second aspect, when the computer program product is executed on one or more computing devices which includes a neural network system. Optionally, the computer program product may be stored on a non-transitory computer-readable medium. The computer program product may also be provided for download, e.g., via a radio or cellular network, the Internet and/or a host computer. Alternatively, or in addition, the method may be encoded in a Field-Programmable Gate Array (FPGA) and/or an Application-Specific Integrated Circuit (ASIC), or the functionality may be provided for download by a hardware description language.

The described neural network system may alternatively or in addition be used for other use cases, where registering of images with different contrast enhancement states is required. This applies, for instance, to $T_1$, $T_2$ mapping techniques which may be based on magnetization preparation through inversion or saturation pulses and/or based on steady-states. In addition, or alternatively, this may apply to apparent diffusion mapping techniques for images which have different b-values which extract parameters through pixelwise fitting of images with different contrast enhancement.

Alternatively, or in addition, corresponding MR phase contrast images may be incorporated into the first and/or second sub-network during testing and/or training. These corresponding MR phase contrast images may indicate body part, organ, vessel, and/or tissue motion direction and magnitude and may serve to further constrain corresponding organ boundaries and landmark locations. The MR phase contrast images may be combined with DCE MR images to serve as a joint input to registration and/or contrast mapping. The combination of both images may be realized using, for instance, multichannel approaches.

Alternatively, or in addition, clinical perfusion measurement curves may be incorporated during training the first and/or second subnetwork. They may be incorporated by a temporal additional or alternative discriminator where results that have been computed for a fixed motion state may serve as positives for the additional or alternative discriminator.

Depending on the computational power and/or hardware constraints, automatic key frame selection and/or hierarchical registration may be incorporated, for instance into the cycle GAN discussed above, and/or the first and/or second sub-network. In particular, AI-based detection and tracking of auxiliary landmarks may be used to estimate respiratory phases. Based thereon, DCE MR images may be registered to their nearest temporal neighbor, thereby using multiple key frames corresponding to the number of respiratory phases. The resulting estimated key frames may be registered onto each other, preferably using an image similarity metric. This image similarity metric may be robust across intensity variations, as for instance, mutual information, and/or contrast normalization. The resulting deformation vector fields may be propagated to the neighboring frames. The neighboring frames in turn may be on top of that registered to their neighboring key frames. This may present a faster, less demanding technique.

As an illustrative example for this approach, 3d+t images may be divided into frames, where frames $t_0$ to $t_2$ belong to an uncontrasted enhancement state, while frames $t_3$ to $t_5$ belong to a contrast uptake enhancement state, and frames $t_6$ to $t_8$ to a contrast saturation enhancement state. In this example, $t_1$, $t_4$ and $t_7$ may be key frames. Accordingly, key frames $t_1$ and $t_7$ may be registered to key frame $t_4$ with an approach which is robust against intensity variations. The resulting deformation frames may be propagated to the neighboring frames $t_0$, $t_2$, $t_3$, $t_5$, $t_6$, $t_8$. The neighboring frames may then be registered to their nearest neighboring key frame with an approach which requires lower runtime. This principle may be applied in a similar fashion to respiratory motion states.

BRIEF DESCRIPTION OF DRAWINGS

Further details of embodiments of the technique are described with reference to the enclosed drawings, wherein:

FIG. 1 shows an example schematic block diagram of a neural network system for assigning a perfusion metric to dynamic contrast-enhanced, DC MR images obtained from a MR scanner;

DETAILED DESCRIPTION

Figure 3:
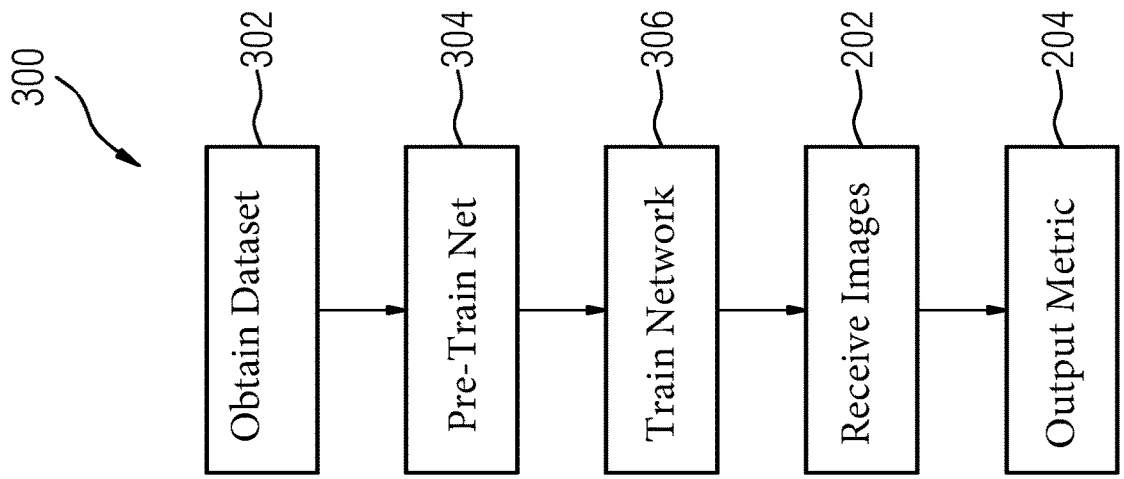
FIG. 3 shows an example flowchart of a method for training a neural network system which may also be implementable by the neural network system of FIG. 1.

In the following description, for purposes of explanation and not limitation, specific details are set forth, such as a neural network system including a plurality of hidden layers to provide a thorough understanding of the technique disclosed herein. It will be apparent to one skilled in the art that the technique may be practiced in other embodiments that depart from these specific details. To avoid repetition, like reference numerals may refer to the same feature or method act. Please note that to map and synthesize may be used interchangeably herein.

FIG. 1 illustrates an example schematic block diagram of a neural network system for assigning a perfusion metric to dynamic contrast-enhanced, DC MR images obtained from a MR scanner; (briefly: 'first and second MR images'). The neural network system is generally referred to by the reference sign 100.

The neural network system 100 includes an MR scanner 102 configured to acquire MR images from a patient, while the patient breathes freely and is administered a contrast enhancement agent. The contrast agent is distributed by the patient's circulatory system over time. During an imaging session, the MR scanner thus acquires MR images which represent changing respiratory motion states of the patient (briefly: 'respiratory state') as well as different contrast agent enhancement states (briefly: 'contrast state'). The MR scanner is particularly configured for the image acquisition of a patient's liver, lung, heart, breast, prostate, or microvascular vessels.

The MR scanner 102 acquires the MR images 104 from a patient and transmits them immediately or with a temporal shift to the image processing device 106. The MR images 104 are a sequence of two- or three-dimensional images over time. They show how an organ, for instance the liver, or another body part moves along with the respiratory motion and absorbs or circulates the contrast agent over time. The MR images 104a are representative of a first contrast state and first respiratory state. The MR images 104b are representative of a second contrast state and a second respiratory state, while the MR images 104c are representative of a third contrast state and a third respiratory motion state and so on. Some of the represented contrast states and/or some of the represented respiratory states may be combined virtually and/or may even be identical.

The image processing device 106 receives the MR images 104. The image processing device 106 is configured to implement an artificial intelligence, AI, based model 114 for processing the MR images 104 and assigning at least one perfusion metric to the MR images 104. The AI-based model includes one or more hidden layers (not shown) as well as an input layer 112 for input of the MR images 104. The AI-based model 114 registers and analyses the MR images 104 pixel-wise or voxel-wise. As a result, at least one perfusion metric is assigned to the received MR images 104 and/or to the registered MR images. The perfusion metric which is assigned to the registered MR images, the combination of which will be referred to by the reference sign 108, is output by an output layer 116 of the AI-based model. Therefrom, the image processing device 106 transfers the MR images 108 to a databank 110, where the MR images 108 may be stored.

Figure 2:
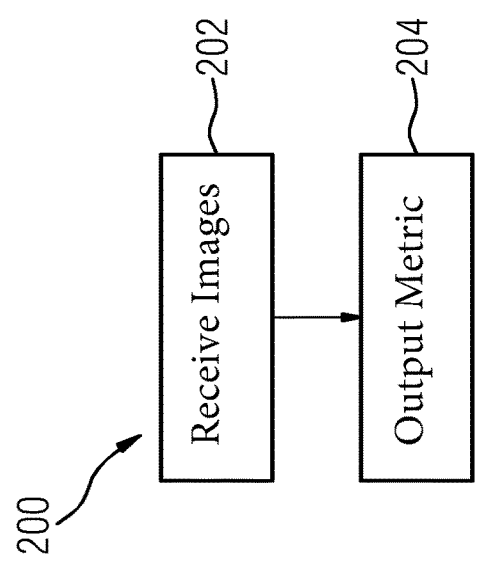
FIG. 2 shows an example flowchart of a method for assigning a perfusion metric to DCE MR images using a neural network system, which neural network system may be implementable by the neural network system of FIG. 1.

FIG. 2 schematically illustrates an example flowchart for a method 200 for assigning a perfusion metric to DCE MR images using a neural network system. The method includes or initiates an act 202 of receiving, at an input layer, one or more MR images which are representative of a first contrast state and of a first respiratory state and one or more further MR images which are representative of a second contrast state and of a second respiratory state. The method 200 further includes or initiates an act 204 of outputting, at an output layer 116, one or more perfusion metrics based on the one or more MR images and the one or more further MR images. Act 204 further includes or initiates the sub-act of assigning the perfusion metric to the one or more MR images and the one or more further MR images.

The method 200 may be performed by the neural network 100 of FIG. 1. For example, the input layer 112 and the output layer 116 may perform the receiving act 202 and the outputting act 204, respectively. Intermediate acts of assigning the at least one perfusion metric to the MR images may be performed by one or more hidden layers of the AI-based model 114.

By the method 200, a novel approach for assigning perfusion parameters to MR images allows for an unsupervised analysis of body parts that are affected by respiratory motion. Also, method 200 allows for pre-processing of MR images with regards to their contrast enhancement.

The example flowchart shown in FIG. 3 illustrates a further embodiment 300 of method 200. In addition to the method acts 202 and 204, which have been discussed with respect to FIG. 2, the method embodiment 300 may also include or initiate the acts 302, 304 and 306 for training of the AI based model 114. The act 302, which is an optional act, may provide for obtaining paired datasets, wherein the datasets may be paired by a respiratory state. The datasets may include instances of MR images 104. The paired datasets may be obtained at act 302 by reconstructing an extra respiratory motion dimension and/or by measuring a craniocaudal movement of an annotated landmark.

Further, act 304 may provide for pre-training of a registration network of the AI-based model 114. During such a pre-training, the registration network may be trained to register MR images 104 of the same contrast. The registration network may be optimized by an intramodality similarity metric, such as localized cross correlation or sum of squared differences. The registration network may optionally be implemented as a GAN (generative adversarial network). In this case, the act 304 may also involve feeding the discriminator of the GAN with image pairs from steady respiratory motion phases. Act 304 may serve to provide a registration network that works accurately for MR images of the same contrast. Act 302 may further include a sub-act for refining the registration network by the previously annotated dataset. Act 304 may conclude with freezing the pre-trained registration network, and in cases, where it has been pre-trained with a discriminator, discarding the discriminator.

Act 306 may involve training a generative network of the AI-based model 114. For training, as well as for future testing, the generative network may be coupled to the registration network. The generative network may serve to map MR images 104 to the same contrast such that the registration network may be able to register them accurately. Act 306 may be realized with a generative network which may have been trained by alternative set-ups. These set-ups are discussed in more detail with regards to following FIG. 5-7.

Figure 4:
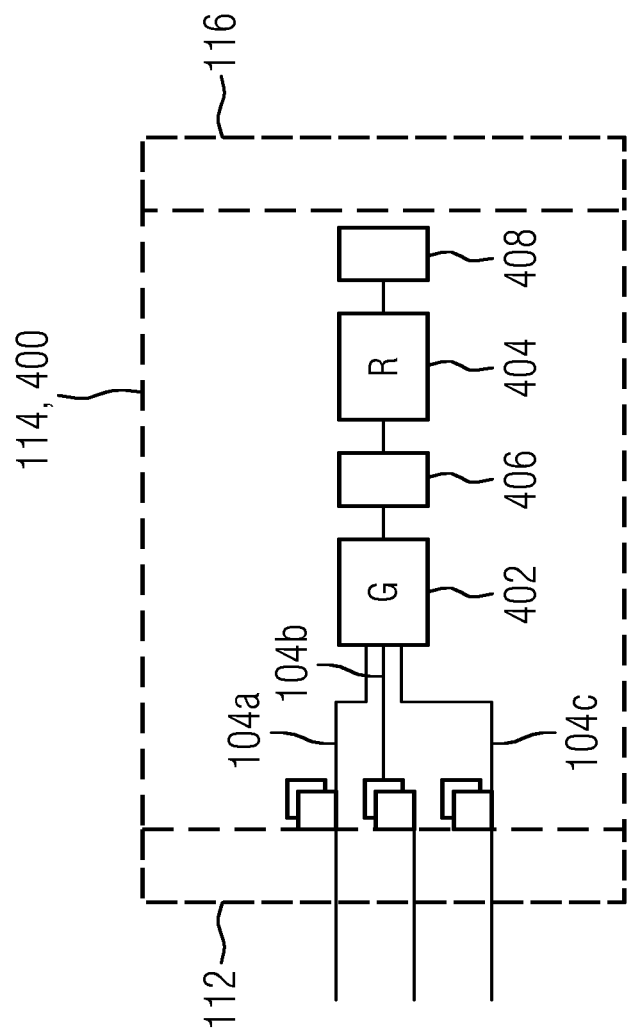
FIG. 4 shows an example schematic block diagram of an AI-based model of the neural network system of FIG. 1, which processes MR images and assigns at least one perfusion metric to the MR images.

FIG. 4 shows an example schematic block diagram of the AI based model 114; 400 of the neural network system 100. The AI-based model 114; 400 is shown in a testing phase that is to say after training and during actually performing assignment of perfusion metrics to MR images (inference phase). The input layer 112 of the AI based model 114; 400 may feed MR images 104 to the generator network 402. The MR images 104 may include MR images 104a which may be representative of a first contrast state and first respiratory state (c1, m1), the MR images 104b which may be representative of a second contrast state and a second respiratory state (c2, m2), while MR images 104c may be representative of a third contrast state and a third respiratory motion state (c3, m3) and so on. Generative network 402 may map images 104a to 104c to the same contrast. The same contrast may be any one of c1, c2, c3. In a preferred embodiment, the MR images may be mapped to a saturated contrast state and/or contrast uptake state, corresponding images are referred to with reference sign 406.

The generative network may then provide the MR images 406, which have been mapped to the same contrast but which still represent different motion states (m1, m2, m3), to the registration network 404. The registration network 404 may perform non-rigid registration of the MR images and may provide registered MR images which have been mapped to the same contrast as an output. These MR images may be referred to with reference numeral 408 in the following. These MR images 408 may be obtained by applying the deformation fields computed by registration network 404 on input MR images 104. Between the registration network 404 and the output layer 116, further processing, such as deriving a perfusion metric from the registered MR images 408 and/or assigning the perfusion metric to the registered MR images 408 may take place.

Figure 5:
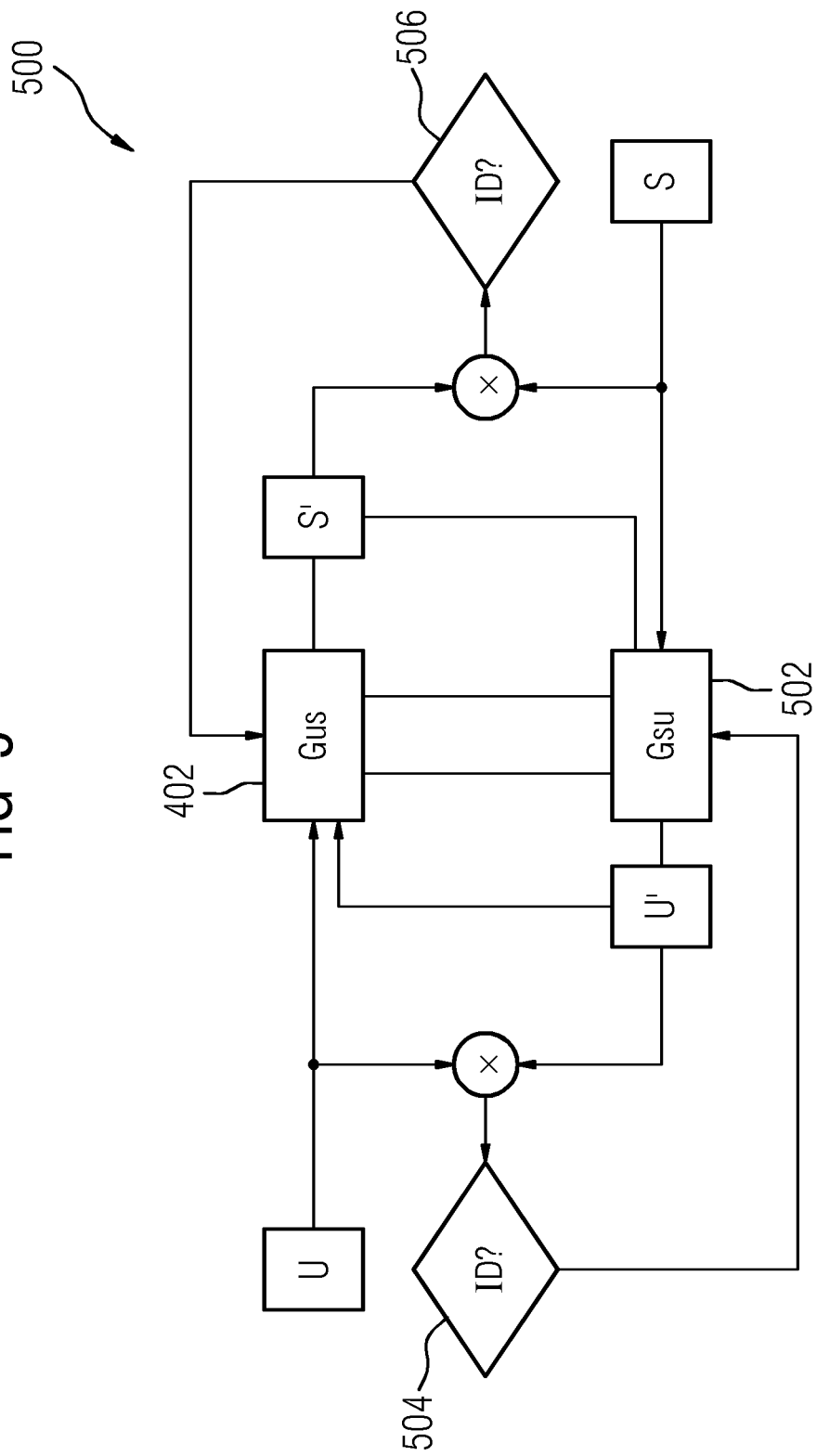
FIG. 5 shows an example schematic block diagram of a deep image-to-image dual inverse network for training a first sub-network of the neural network system of FIG. 1.
Figure 6:
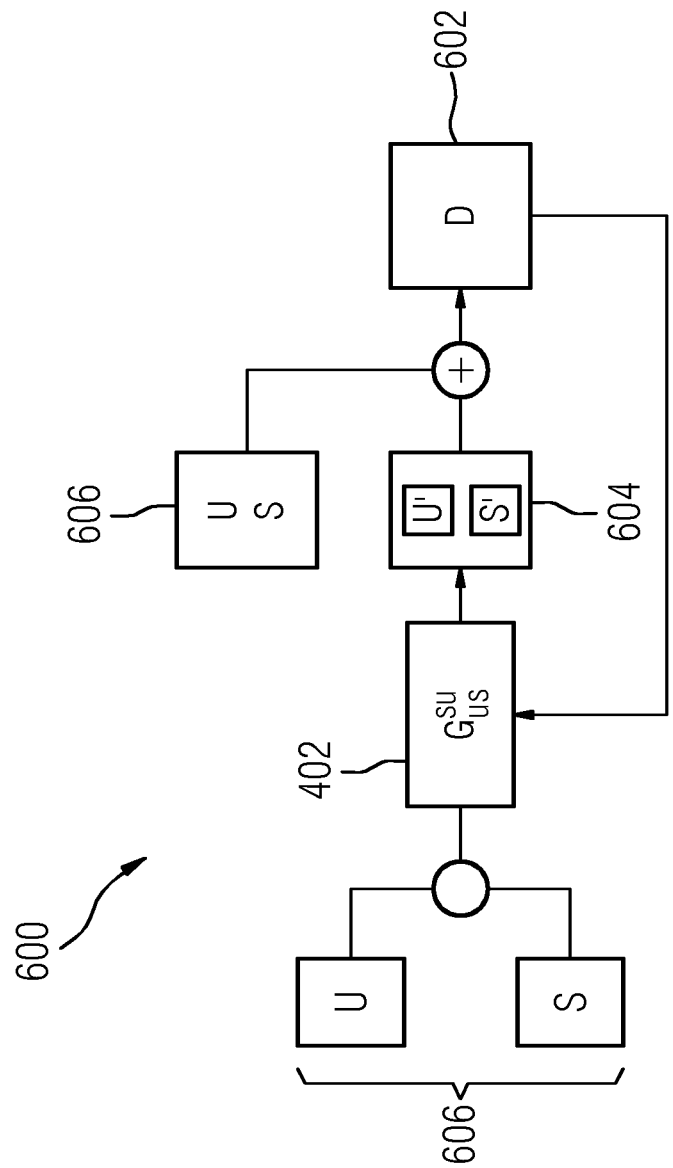
FIG. 6 shows an example schematic generative adversarial network, GAN, for training of the first sub-network of the neural network system of FIG. 1.
Figure 7:
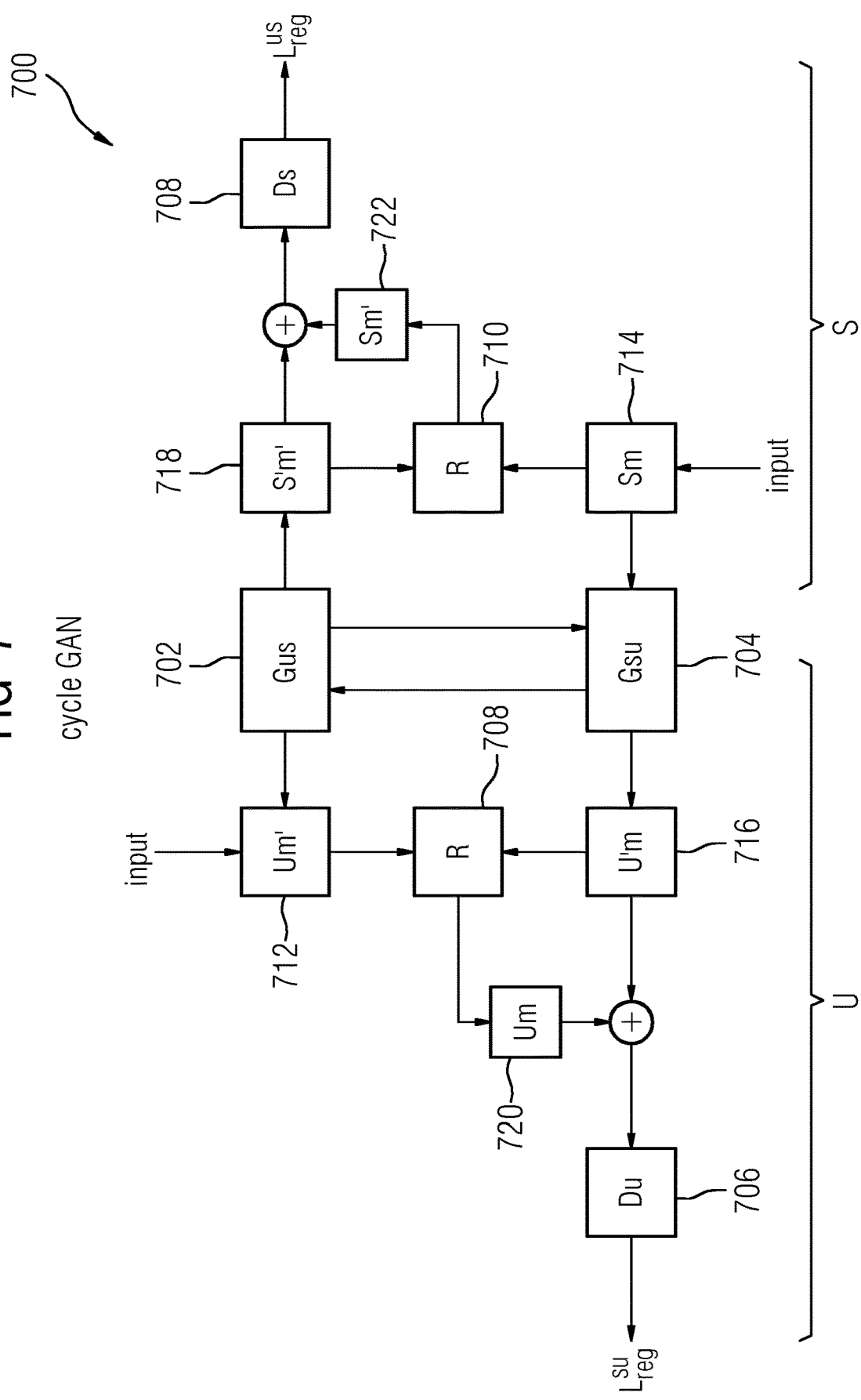
FIG. 7 shows a schematic example of a cycle GAN also for training of the first sub-network of the neural network system of FIG. 1.

FIGS. 5 to 7 show example models for training generative network 402. While FIGS. 5 and 6 show an example wherein the generative network may be trained separately, they may be as well trained in connection with the registration network as it is shown for training the cycle-GAN in connection with FIG. 7.

In FIG. 5, an example schematic deep image-to-image dual inverse network 500 (briefly: 'dual inverse network') for training of the generative network is illustrated. The deep image-to-image dual inverse network 500 may include a generative network, for instance the generative network 402, and a generative network 502 which may act as the inverse of generative network 402. Generative networks 402 and 502 may be trained jointly before the generative network 502 may be discarded previous to testing phase. Generative network 402 may synthesize contrast saturated images, S', from real uncontrasted and/or predicted uncontrasted images, U, U'. Inversely, the generative network 502 may synthesize uncontrasted images, U', from real saturated and/or predicted saturated images, S, S'. A twice synthesized image may be expected to be identical to the respective real image. A potential difference may be determined at an identity loss functions 504, 506. The difference to identity may be fed backwards to the generative networks 402 and 502 for further optimization and/or refinement.

Each of the generative networks 402, 502 may be implemented by an encoder and a decoder and/or an autoencoder including an encoder and a decoder. The encoder may represent the image as latent variables, while the decoder may reconstruct the image from latent variables. Each of the generative networks 402, 502 may be further trained by using at least one further identity constraint, a so-called bridging identity. The bridging identity constraint may be used to optimize the representation of the images in latent variables and/or their reconstruction therefrom. The bridging identity constraint may be based on the equation:

$$G_{us,end}(U) = G_{su,dec}(S).$$

Alternatively, or in addition, the identity constraint may be based on the equations:

$$G_{us,dec}(G_{su,enc}(U)) = U; \text{ and}$$

$$G_{su,dec}(G_{us,enc}(S)) = S$$

(where indices dec represents the decoding process by one of the decoders; while enc represents the encoding process by one of the encoders).

Features discussed with reference to the generative networks 402, 502 of FIG. 5 may also apply and/or be adapted to the registration network 404 when implemented as a conditional variational autoencoder, as discussed above. In this case, the task solved by the autoencoder may be provide a deformation field from input images.

FIG. 6 shows an example schematic generative adversarial network, GAN. The GAN is generally referred to by the reference sign 600. The GAN may include the generative network 402 as well as a discriminator 602. In particular, the generative network 600 may be an autoencoder, or an encoder and the discriminator 602 may be a classifier. The aim of the generative network 600 is to synthesize images, or their representation in latent space as accurately as possible such that the discriminator 600 may not be able to differentiate between synthesized images 604 and real samples 606. However, also the discriminator 602 may learn and improve its ability to distinguish between synthesized images 604 and real images 606, such that the generative network 402 and the discriminator 606 may be in a competitive relationship.

Both, the dual inverse network shown in FIG. 5 and the GAN shown in FIG. 6 may be trained by coupling it with the pre-trained and frozen registration network 404 and by defining a task driven loss Lus,reg or Lsu,reg. The registration network 404 may be coupled to the input side(s) of positives of the dual inverse network or the GAN, respectively. Real samples 606 and real uncontrasted U and real saturated S may also be referred to as positives. To enable a relatively stable registration, the registration network 404 may be fed with pre-aligned positives of a steady respiratory motion phase. The task driven loss may serve to optimize mapping between a uncontrasted domain, U, and a saturated domain, S, or vice versa while also taking into account losses that are caused by the registration network 404. While the losses caused by the registration network 404 are not subject for minimization once the registration network 404 is frozen, the mapping between the uncontrasted and saturated domains may yield better results when also considering losses caused by the registration network 404.

FIG. 7 shows a schematic example of a cycle GAN 700 according to an embodiment. FIG. 7 may be divided into an uncontrasted domain, U, and a saturated domain, S. The cycle GAN 700 may include two generative networks, Gus 702 and Gsu 704. The generative networks Gus 702 and Gsu 704 may be mutually inverse networks and information may be exchanged between them. The information may concern, for instance, bridging identity constraints as discussed with reference to FIG. 5. The common goal of the generative networks Gus 702 and Gsu 704 is to map images, or latent image representation, from one domain to another domain as realistically as possible in order to deceive the discriminators Du 706 and Ds 708.

In contrast to a more traditional cycle GAN, the cycle GAN 700 shown may also include registration networks 708 and 710. The registration networks may be coupled to the generative networks Gus 702 and Gsu 704. The registration networks 708 and 710 may be pretrained to warp input images 714, 716 to the respiratory motion state m or m' of the output images 716, 718 which are provided by the generative networks' Gus 702 and Gsu 704. The registration networks 708, 710 may thereby predict warped images 720, 722.

During training, the discriminators 706, 708 may judge deviation between generated images 716, 718 and warped images 720, 722. The deviation may be quantified within task-driven loss terms Lsu,reg and Lus,reg. The task-driven loss which quantifies the quality of the cycle GAN during training with frozen registration networks 708, 710 is fed back to the generative networks 702, 704.

At testing stage, the discriminators may be discarded and only the registration network and a generator may be kept. Preferably, the generator Gsu may be kept as it yields the most reliable results, in particular with respect to image representation of more finely grained objects, as for instance vessels. This may hold for any training set-up of FIGS. 5 to 7.

Besides the task-driven loss discussed with respect to FIG. 7, additional loss terms may be defined and used for training the generative networks Gus, Gsu, 702, 704.

Figure 8:
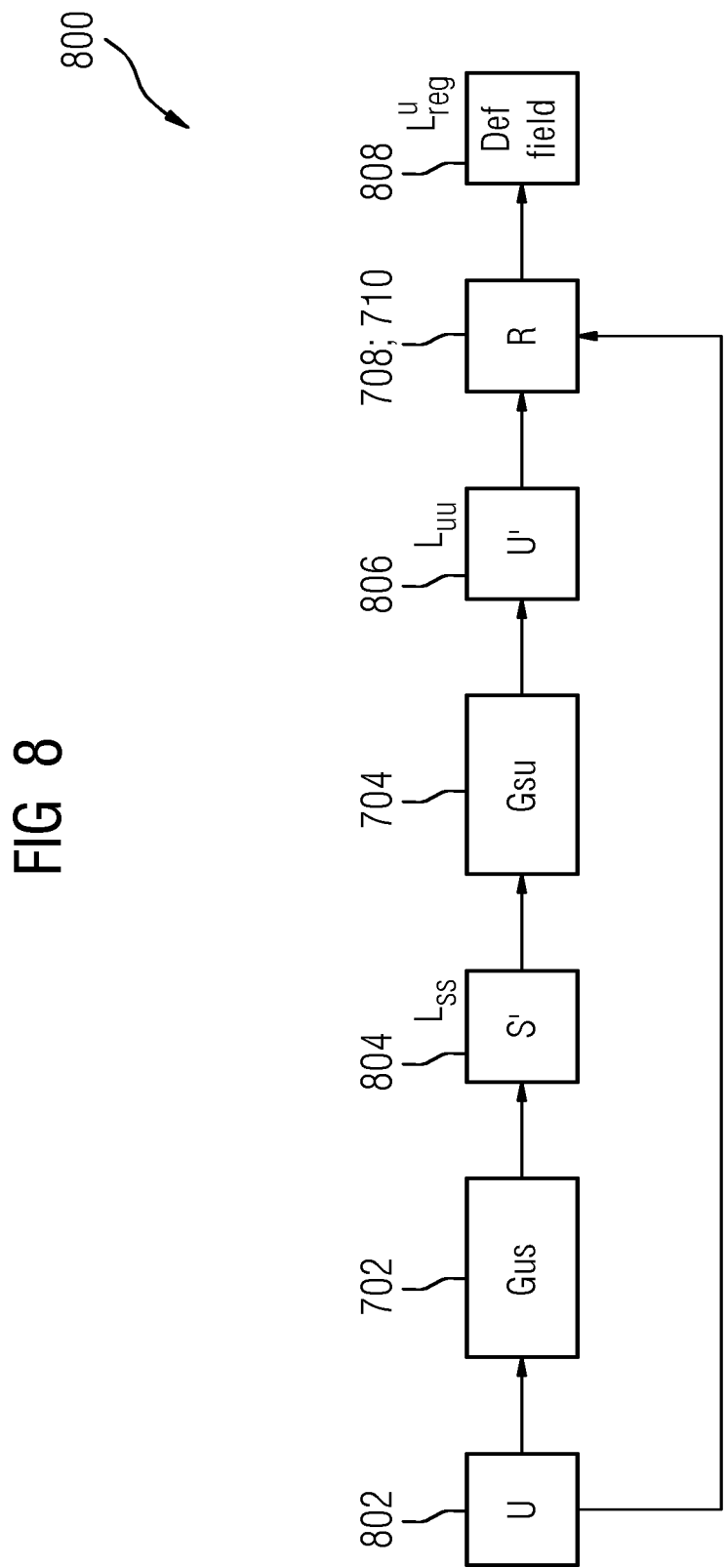
FIG. 8 illustrates a schematic example of an adapted cycle consistency loss term for training of the first and/or second sub-network of the neural network of FIG. 1.

FIG. 8 illustrates a schematic example of an adapted cycle consistency loss term. The cycle consistency loss term may include three particular loss terms. The first loss term, Lss, may be representative of the loss evoked when mapping an input from the uncontrasted domain U 802 to the saturated domain S, thereby generating predicted saturated image S'804 by generative network 702. The second loss term, Luu, may be representative of the loss evoked when mapping the predicted saturated image S' to the uncontrasted domain, thereby generating the predicted saturated image 806 U'. Finally, the predicted saturated image S' is registered by the registration network 708, 710. The resulting output should be the identity of the input image 802. Deviations therefrom may be quantified by loss term Lu,reg, 808. Cycle consistency loss may, of course, be determined in an analogous sequence when starting with the saturated domain S.

Figure 9:
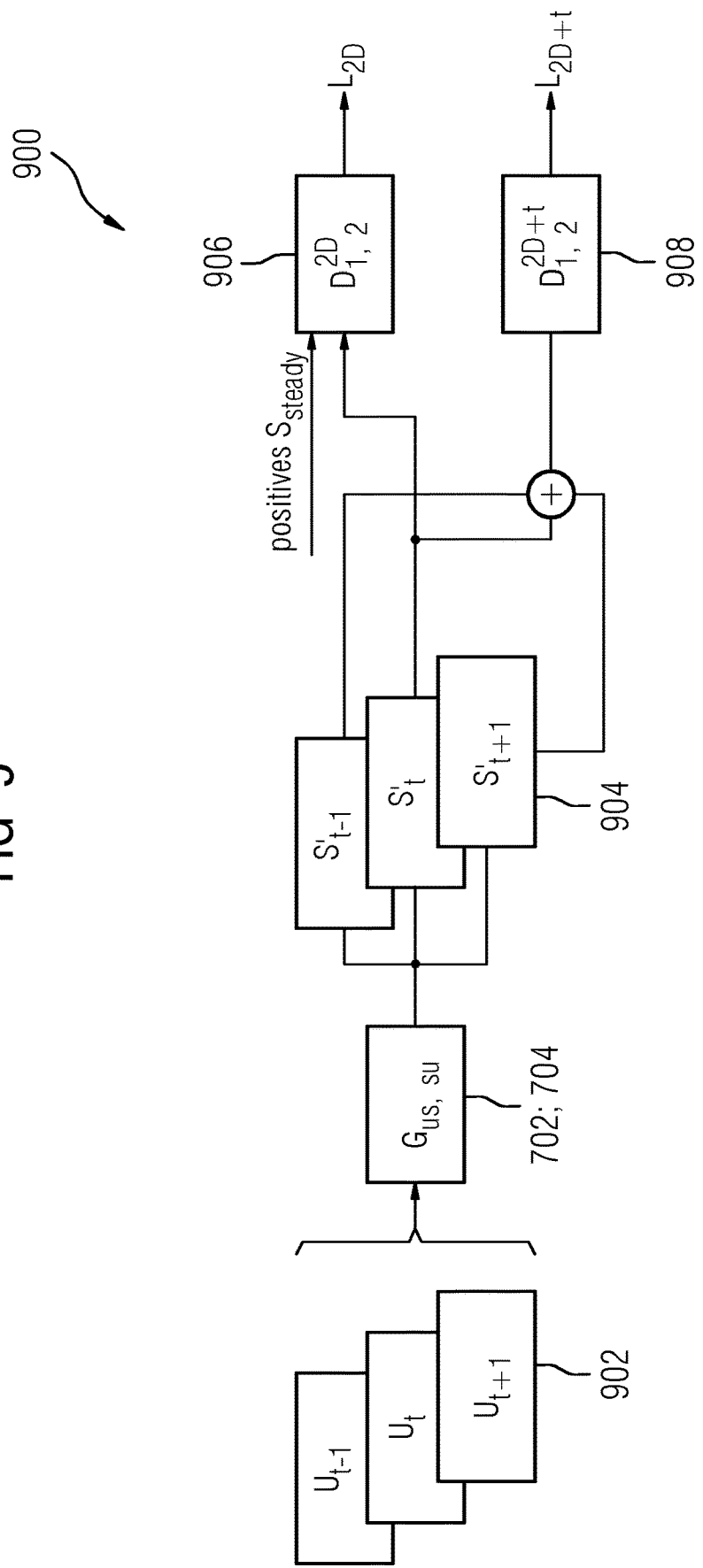
FIG. 9 shows a schematic example of a spatio-temporal consistency loss term for training of the first and/or second sub-network of the neural network of FIG. 1.

Another loss term, illustrated in FIG. 9, may be representative of spatio-temporal consistency losses. Accordingly, the generative networks Gus, Gsu, 702, 704 may be trained with a sequence of N 2D slices over both space and time 902 which belong to the uncontrasted domain. The generative networks Gus, Gsu, 702, 704 may map the N 2D sequence to a predicted saturated image sequence 904. A discriminator 906 may judge whether a singular predicted saturated 2D slice is distinguishable to pairs from Ssteady saturated images. A loss term L2D may be derived from the result. Meanwhile, a second discriminator 908 may judge whether the predicted 2D slices are distinguishable from each other which will result in loss term L2D+t.

Generally, in computer science at least from a computational point of view, a software implementation and a corresponding hardware implementation are equivalent, at least from a computability perspective. For avoiding redundancy, these embodiments are not reiterated or explicitly described again for the system, because they have been described already in relation to the method and vice versa.

Wherever not already described explicitly, individual embodiments, or their individual aspects and features, described herein can be combined or exchanged with one another, even when mentioned in other embodiments, without limiting or widening the scope of the described invention, whenever such a combination or exchange is meaningful and in the sense of this invention. Accordingly, any feature may be combined with at least one other feature, which is claimed and/or described in this application.

The invention claimed is:

1. A neural network system for assigning at least one perfusion metric to dynamic contrast-enhanced (DCE) magnetic resonance (MR) images, the DCE MR images obtained from a MR scanner and under a free-breathing protocol, the neural network system comprising:
  an input layer configured to receive at least one DCE MR image representative of a first contrast enhancement state and of a first respiratory motion state and at least one further DCE MR image representative of a second contrast enhancement state and of a second respiratory motion state; and
  an output layer configured to output at least one perfusion metric based on the at least one DCE MR image and the at least one further DCE MR image,
  wherein the neural network system with interconnections between the input layer and the output layer was trained by a plurality of datasets, each of the datasets comprising an instance of the at least one DCE MR image and of the at least one further DCE MR image for the input layer (114) and the at least one perfusion metric for the output layer; and
  wherein the neural network comprises a first sub-network and a second sub-network, and wherein the interconnections comprise cross-connection between the first sub-network and the second sub-network at the input layer and/or at least one hidden layer between the input layer and the output layer.

2. The neural network system of claim 1, wherein the at least one perfusion metric comprises at least one metric from the group of:
(a) a transfer constant;
(b) a measure of capillary permeability;
(c) a reflux constant; and
(d) an extra vascular extra cellular volume fraction.

3. The neural network system of claim 1, wherein the first sub-network was trained to perform contrast enhancement state mapping to map the at least one DCE MR image and the at least one further DCE MR image to the same contrast enhancement state, the first sub-network comprising:
(a) a deep image-to-image dual inverse network;
(b) a generative adversarial network; or
(c) a cycle GAN.

4. The neural network system of claim 3, wherein the first sub-network comprises the cycle GAN, the cycle GAN comprising two GANs, wherein the two GANs were trained to jointly perform contrast enhancement state mapping;
wherein the contrast enhancement state indicates continuous contrast enhancement representing uncontrasted to contrast uptake to saturated;
wherein a first of the two GANs was trained to map an uncontrasted DCE MR image to a predicted contrast uptake DCE MR image and/or a predicted saturated DCE MR image;
wherein a second of the two GANs was trained to map a contrast uptake DCE MR image and/or a saturated DCE MR image to a predicted uncontrasted DCE MR image.

5. The neural network system of claim 1,
wherein the second sub-network was trained to estimate a deformation field for registration of the at least one DCE MR image and the at least one further DCE MR image,
wherein the at least one DCE MR image and the at least one further DCE MR image are mapped to the same contrast enhancement state.

6. The neural network system of claim 1, wherein the second sub-network comprises:
(a) a generative adversarial network
(b) a conditional variational autoencoder; or
(c) an intensity-based network.

7. The neural network system of claim 1, wherein the first sub-network and/or the second sub-network were trained by unpaired datasets and/or by paired datasets, wherein the datasets are paired by respiratory motion state, wherein the paired datasets comprise:
(a) Reconstructed with an extra respiratory motion state dimension based on respiratory motion signals derived from the datasets; or
(b) measured craniocaudal movement of an automatically and/or semi-automatically and/or manually annotated landmark.

8. The neural network system of claim 1, wherein the first sub-network and the second sub-network were trained jointly and/or separately by minimizing at least one loss term.

9. The neural network system of claim 8, wherein the at least one loss term was representative of the registration quality between:
(a) predicted saturated DCE MR image and/or predicted uptake DCE MR image and registered uptake DCE MR image and/or saturated DCE MR image; or
(b) predicted uncontrasted DCE MR image and registered uncontrasted DCE MR image.

10. The neural network system of claim 8, wherein the at least one loss term was minimized using pre-aligned positives.

11. The neural network system of claim 8, wherein the at least one loss term was representative of artificial deformations.

12. The neural network system of claim 8, wherein the at least one loss term is further representative of:
an image similarity loss between the predicted contrast uptake DCE MR image and/or predicted saturated DCE MR image and a uncontrasted DCE MR image; and/or
an image similarity loss between the predicted uncontrasted DCE MR image and the predicted contrast uptake DCE MR image and/or predicted saturated DCE MR image; and/or
a deformation loss between a predicted uncontrasted DCE MR image and a uncontrasted DCE MRI.

13. The neural network system of claim 8, wherein the at least one loss term is further representative of a loss between a predicted saturated spatio-temporal DCE MR image sequence and paired steady respiratory motion state DCE MR images.

14. A method of assigning at least one perfusion metric to dynamic contrast-enhanced (DCE) magnetic resonance (MR) images, the DCE MR images obtained from a MR scanner and under a free-breathing protocol, the method using a neural network system, the method comprising:
receiving, at an input layer of the neural network system, at least one DCE MR image representative of a first contrast enhancement state and of a first respiratory motion state and at least one further DCE MR image representative of a second contrast enhancement state and of a second respiratory motion state; and
outputting, at an output layer of the neural network system, at least one perfusion metric based on the at least one DCE MR image and the at least one further DCE MR image,
wherein the neural network system has interconnections between the input layer and the output layer and was trained by a plurality of datasets, each of the datasets comprising an instance of the at least one DCE MR image and of the at least one further DCE MR image for the input layer and the at least one perfusion metric for the output layer; and
wherein the neural network system comprises a first sub-network and a second sub-network, and wherein the interconnections comprise cross-connection between the first sub-network and the second sub-network at the input layer and/or at least one hidden layer between the input layer and the output layer.

15. The method of claim 14, further comprising:
pretraining a third sub-network to perform registration of the at least one DCE MR image and the at least one further DCE MR image; and
training a fourth sub-network to map the at least one DCE MR image and the at least one further DCE MR image to the same contrast enhancement state.

16. The method of claim 14, further comprising:
training the neural network system and/or the first sub-network and/or the second sub-network with paired datasets, wherein the datasets are paired by respiratory motion state; and/or
obtaining the paired datasets by reconstructing an extra respiratory motion state dimension based on respiratory motion signals derived from the datasets and/or measuring craniocaudal movement of an automatically and/or semi-automatically and/or manually annotated landmark.

17. The method of claim 14, Wherein outputting comprises outputting the at least one perfusion metric as:
(a) a transfer constant;
(b) a measure of capillary permeability;
(c) a reflux constant; and/or
(d) an extra vascular extra cellular volume fraction.

18. The method of claim 14, further comprising training the first sub-network to perform contrast enhancement state mapping to map the at least one DCE MR image and the at least one further DCE MR image to the same contrast enhancement state, the first sub-network comprising:
(e) a deep image-to-image dual inverse network;
(f) a generative adversarial network; or
(g) a cycle GAN.

19. The method of claim 14, wherein the first sub-network comprises the cycle GAN, the cycle GAN comprising two GANs, wherein the two GANs are trained to jointly perform contrast enhancement state mapping;
wherein the contrast enhancement state indicates continuous contrast enhancement representing uncontrasted to contrast uptake to saturated;
wherein a first of the two GANs is trained to map an uncontrasted DCE MR image to a predicted contrast uptake DCE MR image and/or a predicted saturated DCE MR image;
wherein a second of the two GANs is trained to map a contrast uptake DCE MR image and/or a saturated DCE MR image to a predicted uncontrasted DCE MR image.

20. The method of claim 14, wherein outputting comprises estimating by the second sub-network a deformation field for registration of the at least one DCE MR image and the at least one further DCE MR image, wherein the at least one DCE MR image and the at least one further DCE MR image are mapped to the same contrast enhancement state.

* * * * *